(12) United States Patent
Hughes et al.

(10) Patent No.: US 9,241,002 B2
(45) Date of Patent: Jan. 19, 2016

(54) TRUSTED RELATIONSHIPS IN MULTIPLE ORGANIZATION SUPPORT IN A NETWORKED SYSTEM

(75) Inventors: Shannon Ray Hughes, Fuguay Varina, NC (US); Jesus M. Rodriguez, Wake Forest, NC (US); Pradeep Kilambi, Raleigh, NC (US); Jeffrey R. Ortel, Raleigh, NC (US); Maureen E. Duffy, Somerville, MA (US)

(73) Assignee: Red Hat, Inc., Raleigh, NC (US)

(*) Notice: Subject to any disclaimer, the term of this patent is extended or adjusted under 35 U.S.C. 154(b) by 1036 days.

(21) Appl. No.: 12/268,356

(22) Filed: Nov. 10, 2008

(65) Prior Publication Data
US 2010/0122173 A1 May 13, 2010

(51) Int. Cl.
*G06F 3/048* (2013.01)
*H04L 29/06* (2006.01)

(52) U.S. Cl.
CPC .......... *H04L 63/104* (2013.01); *H04L 63/0272* (2013.01); *H04L 63/0281* (2013.01)

(58) Field of Classification Search
CPC . G06F 17/243; G06F 17/211; G06F 17/2247; G06F 3/0481; G06F 21/31
USPC .......... 709/223, 225, 227, 229; 715/733, 734, 715/737, 738, 741, 743; 726/2, 3, 4, 5, 6, 726/16, 17, 18, 19, 26, 27, 28, 29, 30
See application file for complete search history.

(56) References Cited

U.S. PATENT DOCUMENTS

| | | | |
|---|---|---|---|
| 7,877,409 B2* | 1/2011 | Lim | 707/781 |
| 7,900,248 B2* | 3/2011 | Ellison et al. | 726/10 |
| 8,051,296 B2* | 11/2011 | Driscoll | 713/182 |
| 2004/0044905 A1* | 3/2004 | Heath et al. | 713/200 |
| 2005/0125359 A1* | 6/2005 | Levin et al. | 705/59 |
| 2006/0031636 A1* | 2/2006 | Mizuno | 711/114 |
| 2006/0265760 A1* | 11/2006 | Daemke et al. | 726/27 |
| 2007/0124467 A1* | 5/2007 | Glassco et al. | 709/225 |
| 2007/0299975 A1* | 12/2007 | Daschakowsky et al. | 709/228 |
| 2008/0060058 A1* | 3/2008 | Shea et al. | 726/4 |
| 2008/0162604 A1* | 7/2008 | Soulet et al. | 707/204 |
| 2008/0215642 A1* | 9/2008 | Man et al. | 707/204 |
| 2008/0270515 A1* | 10/2008 | Chen et al. | 709/202 |
| 2008/0271061 A1* | 10/2008 | Branson et al. | 719/328 |
| 2008/0301780 A1* | 12/2008 | Ellison et al. | 726/4 |
| 2008/0307486 A1* | 12/2008 | Ellison et al. | 726/1 |
| 2009/0204516 A1* | 8/2009 | Berry et al. | 705/30 |

* cited by examiner

*Primary Examiner* — Rashawn Tillery
(74) *Attorney, Agent, or Firm* — Lowenstein Sandler LLP

(57) ABSTRACT

Some embodiments of supporting trusted relationships between multiple organizations in a networked system have been presented. In one embodiment, a centralized server manages a networked system, which includes the centralized server and a set of computing machines coupled to each other within an internal network of a customer. The centralized server may segregate data and encapsulating resources within the networked system by a set of organizations created by the customer. Furthermore, a trusted relationship defined by a system administrator of the centralized server may be applied to a first one and a second one of the set of organizations.

21 Claims, 23 Drawing Sheets

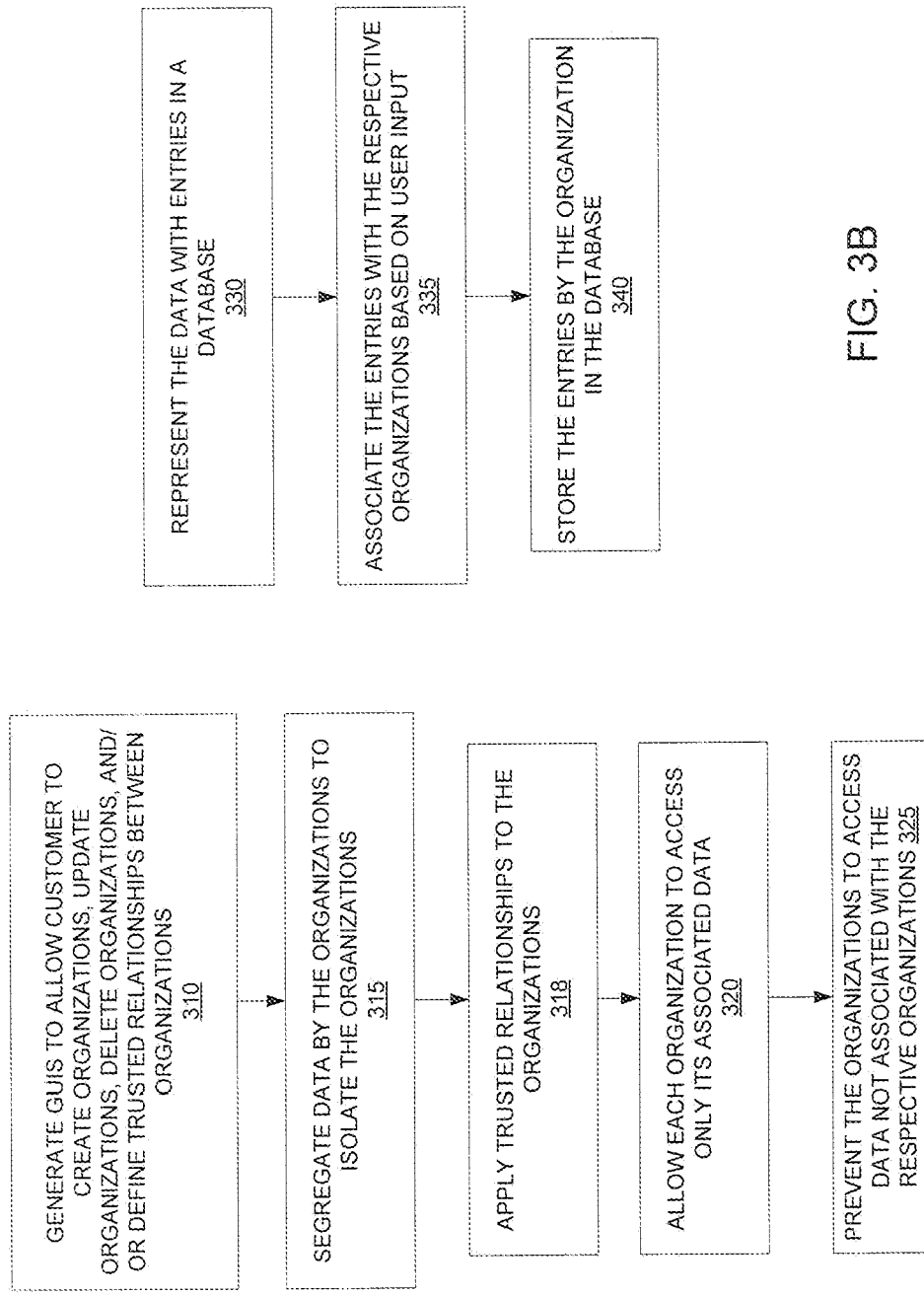

410

| Your RHN | Systems | Errata | Channels | Configuration | Schedule | Users | Satellite Tools | Help |

NO SYSTEMS SELECTED [MANAGE]

Satellite Configuration
Organizations
Users
Subscriptions
Task Engine Status

Create New Organization

Organization Details

Company Name: Really Big Enterprise, Inc.
Tip: This name is determined by the Satellite's certificate. Contact your Red Hat sales representative to modify this name.

Organization Name: [_____] 412
Example: "Sales Department".
Tip: Between 3 and 128 characters are allowed.

Create Initial Organization Administrator

Your Satellite Administrator role will not allow you to log into or modify this new organization, and your Satellite login cannot be a member of more than one organization. Consequently, you will need to create a new login for the initial Organization Administrator for this new organization.

Desired Login: [_____] 414
Examples: "sales-admin", "admin_prodops@example.com", "sales.admin"
Tip: The login must be at least 5 and no more than 45 characters long.

Desired Password: [_____] 416
Tip: The password must be at least 5 and no more than 32 characters long.

Confirm Password: [_____] 418

[Create Organization]

| Your RHN | Systems | Errata | Channels | Configuration | Schedule | Users | Satellite Tools | Help |

MANAGE

NO SYSTEMS SELECTED

- Satellite Configuration
- Organizations
- Users
- Subscriptions
- Software Channel Entitlements
- System Entitlements
- Task Engine Status

Software Channel Entitlements Across Satellite

The following is a list of all software channel entitlements on this Satellite, across organizations, and their usage. Click on the entitlement's name for more details about it, or click on its usage counts for more detailed usage information.

A B C D E F G H I J K L M N O P Q R S T U V W X Y Z 0 1 2 3 4 5 6 7 8 9

Filter by Entitlement Name: [ ] Go!

1-5 of 237  |< < > >|

| Entitlement Name | Allocated* | Not Allocated* | Not in U |
|---|---|---|---|
| Red Hat Enterprise Linux Server | 800 | 567 | 233 |
| Red Hat Enterprise Linux Client | 400 | 128 | 272 |
| Red Hat Directory Server | 5 | 3 | 2 |
| Red Hat Cluster Suite | 10 | 4 | 6 |
| Red Hat Network Satellite | 2 | 2 | 0 |

1-5 of 237  |< < > >|

*Tip: 'Allocated' refers to the total number of entitlements, either used by a registered system or not, that have allocated to a particular organization.
'Not Allocated' refers to the number of entitlements that are not allocated to any organization.
'Not in Use' refers to entitlements that have been allocated to an organization but are not currently consu by a system.

FIG. 4D

| Your RHN | Systems | Errata | Channels | Configuration | Schedule | Users | Satellite Tools | Help |
|---|---|---|---|---|---|---|---|---|

NO SYSTEMS SELECTED | MANAGE

- Satellite Configuration
- Organizations
- Users
- Subscriptions
- Software Channel Entitlements
- System Entitlements
- Task Engine Status

System Entitlements Across Satellite

The following is a list of all system entitlements on this Satellite, across organizations, and their usage.
Click on the entitlement's name for more details about it, or click on its usage counts for more detailed usage information.

A B C D E F G H I J K L M N O P Q R S T U V W X Y Z 0 1 2 3 4 5 6 7 8 9

Filter by Entitlement Name: [        ] Go!

1-5 of 5 |< < > >|

| Entitlement Name | Allocated* | Not Allocated* | Not in U |
|---|---|---|---|
| Management (Base) | 800 | 567 | 233 |
| Provisioning (Add-On) | 400 | 128 | 272 |
| Monitoring (Add-On) | 5 | 3 | 2 |
| Virtualization (Add-On) | 10 | 4 | 6 |
| Virtualization Platform (Add-On) | 2 | 2 | 0 |

1-5 of 5 |< < > >|

*Tip: 'Allocated' refers to the total number of entitlements, either used by a registered system or not, that have allocated to a particular organization.
'Not Allocated' refers to the number of entitlements that are not allocated to any organization.
'Not in Use' refers to entitlements that have been allocated to an organization but are not currently consu by a system.

| Your RHN | Systems | Errata | Channels | Configuration | Schedule | Users | Satellite Tools | Help |

NO SYSTEMS SELECTED  [MANAGE]

Sidebar:
- Satellite Configuration
- Organizations
- Users
- Subscriptions
- Task Engine Status

Acme Corporation  delete organization

Details | Users | Subscriptions

Organization Details — 461

| Company Name: | Acme International, Ltd. — 462 |
| Organization Name: | Acme Corporation |
| | Tip: Between 3 and 128 characters are allowed — 463 |
| Organization Administrators: | darthy_v, pgalleghan@acme.com, boba_fett, billy-g, ggainey, ... (View all 12) |

Organization Statistics

| Active Users: | 1,764 — 464 |
| Systems: | 23,435 (10,000 up-to-date, 523 not checking in) — 465 |
| System Groups: | 312 — 466 |
| Activation Keys: | 124 — 467 |
| Kickstart Profiles: | 237 — 468 |
| Configuration Channels: | 5 — 469 |

[Update Organization]

FIG. 4F

| Your RHN | Systems | Errata | Channels | Configuration | Schedule | Users | Satellite Tools | Help |
|---|---|---|---|---|---|---|---|---|

NO SYSTEMS SELECTED  MANAGE

— 470

| Satellite Configuration |
|---|
| Organizations |
| Users |
| Subscriptions |
| Task Engine Status |

472

Acme Corporation

The following is a list of all users on in the Acme Corp. organization. Note that you will only have access to modify the details of these users if you are logged into the Acme Corp. organization and have organization administrator privileges.

A B C D E F G H I J K L M N O P Q R S T U V W X Y Z 0 1 2 3 4 5 6 7 8 9

Filter by Login: [        ] Go!      476      1-5 of 237  |< < >

474

| Login | Real Name | Organization Admin? |
|---|---|---|
| chewy | Woody |  |
| d_vader | Vader, Darth | 472A |
| hellok | Kitty | YES |
| linnyT | Torvalds, Linux  472c | YES |
| paris@hilton.com | Hilton, Paris |  |

| Your RHN | Systems | Errata | Channels | Configuration | Schedule | Users | Satellite Tools | Help |

490

Acme Corporation

| Details | Users | Subscriptions | Users | NO SYSTEMS SELECTED | MANAGE |

Software Channel Entitlements    System Entitlements delete organization

Software Channel Entitlement Counts

Below you may modify the total number of software channel entitlements available to the Acme Corporation organization in a per-channel basis. If you'd like to increase the number of entitlements available for a particular entitlement, you are limited by the range indicated next to the text field.

A B C D E F G H I J K L M N O P Q R S T U V W X Y Z 0 1 2 3 4 5 6 7 8 9

Filter by Entitlement Name: [ ] Go!

1-5 of 148  I < ˅ ˃

498

| Entitlement Name | Used | Total | Assign New Total |
|---|---|---|---|
| Red Hat Enterprise Linux Server | 567 | 800 | 800  Possible Values: 0 to 1600 |
| Red Hat Enterprise Linux Client | 28 | 400 | 400  Possible Values: 0 to 1600 |
| Red Hat Directory Server | 3 | 5 | 5  Possible Values: 0 to 1600 |
| Red Hat Cluster Suite | 4 | 10 | 10  Possible Values: 0 to 1600 |
| Red Hat Network Satellite | 2 | 2 | 2  Possible Values: 0 to 1600 |

492

1-5 of 148  I < ˅ ˃

[Update List]                                                          [Update Entitlement Counts]

Satellite Configuration
Organizations
Users
Subscriptions
Task Engine Status

| Your RHN | Systems | Errata | Channels | Configuration | Schedule | Users | Satellite Tools | Help |

NO SYSTEMS SELECTED [MANAGE]

Satellite Configuration
Organizations
Users
Subscriptions
Task Engine Status dv4d3r

Details | Systems

Information about this user appears below. You may only edit this user's information if you have organization administrator privileges for this user's organization and you are logged into that organization.

User Details — 512

| Title: | Mr. — 512A |
| First Name: | Darth — 512B |
| Last Name: | Vader — 512C |
| Email: | dvader@acme.com — 512D |
| Position: | Operation Director — 512E |

Account Details — 514

| Login: | dv4d3r — 514A |
| Company Name: | Acme International, Ltd. — 514B |
| Organization: | Acme Corporation — 514C       514D |
| Roles: | Organization Administrator, Configuration Administrator, System Group Administrator, Activation Key Administrator, Channel Administrator |
| Created: | 4/17/2098 2:52:51 AM EDT — 514E |

FIG. 4J

| | | | | | | | | |
|---|---|---|---|---|---|---|---|---|
| Your RHN | Systems | Errata | Channels | Configuration | Schedule | Users | Satellite Tools | Help |

NO SYSTEMS SELECTED [MANAGE]

- Satellite Configuration
- Organizations
- Users
- Subscriptions
- Task Engine Status dv4d3r

Details | Systems

Systems Associated with this User

This user has registered and/or has administrative access to the following systems:

Filter by Login: [　　　] [Go!]    1-5

| System Name | IP Address | Relationship to System |
|---|---|---|
| div1.acmecorp.acmeintl.com | 123.4.5.124 | Administrative Access |
| div2.acmecorp.acmeintl.com | 66.66.66.66 | Registered System |
| div3.acmecorp.acmeintl.com | 10.10.4.4 | Administrative Access, Registered System |
| div4.acmecorp.acmeintl.com | 30.72.72.9 | Administrative Access |
| div5.acmecorp.acmeintl.com | 88.96.66.3 | Administrative Access |

| Your RHN | Systems | Errata | Channels | Configuration | Schedule | Users | Satellite Tools | Help |

NO SYSTEMS SELECTED [MANAGE]

Red Hat Enterprise Linux (core server)     delete organization

Satellite Configuration

Organizations

Users

Subscriptions

Task Engine Status

Details | Organizations

Entitlement Usage — 532 / 532A / 532B / 532C

| Total Available: | Total: 2400, Used: 900, Free: 1500 |

Tip: These numbers reflect what the current counts are for this entitlement right now across organizations.

| Organization Usage: | 3 of the 6 organizations on this Satellite have at least one registered system using this entitlement |

532D

Access Granted by this Entitlement — 534

A single "Red Hat Enterprise Linux (core server)" entitlement may be used to gain access to any one of the following software channels.

| Channel Name | Packages | |
|---|---|---|
| ☐ Red Hat Enterprise Linux (v.5 for 32-bit x86) | 2469 | |
| ☐ Red Hat Enterprise Linux (v.5 for 64-bit x86_64) | 3227 | |
| ☐ Red Hat Enterprise Linux (v.5 for 64-bit itanium) | 2532 | |
| ☐ Red Hat Enterprise Linux (v.5 for 64-bit IBM POWER) | 3189 | |
| ☐ Red Hat Enterprise Linux AS (v.4 for 32-bit x86) | 4376 | |
| ☐ Red Hat Enterprise Linux AS (v.4 for 64-bit Intel Itanium) | 4718 | |
| ☐ Red Hat Enterprise Linux AS (v.4 for 64-bit AMD/Intel EM64T) | 4983 | |
| ☐ Red Hat Enterprise Linux AS (v. 4 for 64-bit IBM POWER) | 4902 | |
| ☐ Red Hat Enterprise Linux ES (v.4 for 32-bit x86) | 4376 | 0 |
| ☐ Red Hat Enterprise Linux ES (v.4 for 64-bit Intel Itanium) | 4716 | 0 |
| ☐ Red Hat Enterprise Linux ES (v.4 for 64-bit AMD/Intel EM64T) | 4983 | 0 |
| ☐ Red Hat Enterprise Linux AS (v.3 for x86) | 4636 | 0 |
| ☐ Red Hat Enterprise Linux AS (v.3 for itanium) | 4862 | 0 |
| ☐ Red Hat Enterprise Linux AS (v.3 for AMD64/Intel EM64T) | 5097 | 0 |
| ☐ Red Hat Enterprise Linux AS (v3 for iSeries and pSeries) | 4966 | 0 |
| ☐ Red Hat Enterprise Linux ES (v.3 for x86) | 4655 | 0 |
| ☐ Red Hat Enterprise Linux ES (v.3 for Itanium) | 4398 | 0 |
| ☐ Red Hat Enterprise Linux ES (v.3 for AMD64/Intel EM64T) | 4601 | 0 |
| ☐ Red Hat Enterprise Linux AS (v.2.1 for i386) | 3548 | 0 |
| ☐ Red Hat Enterprise Linux ES (v.2.1 for i386) | 3039 | 0 |
| ☐ Red Hat Linux Advanced Server 2.1 for the Itanium Processor | 3002 | 0 |

FIG. 4L

|  |  |  |  |  |  |  |  | ─ 540 |
|---|---|---|---|---|---|---|---|---|

| Your RHN | Systems | Errata | Channels | Configuration | Schedule | Users | Satellite Tools | Help |
|---|---|---|---|---|---|---|---|---|

NO SYSTEMS SELECTED  [MANAGE]

| Satellite Configuration |
|---|
| Organizations |
| Users |
| Subscriptions |
| Task Engine Status |

Management (Base)

Details \ Organizations

Entitlement Usage ── 542 ── 542A ── 542B ── 542C

| Total Available: | Total: 2400, Used: 900, Free: 1500 |
|---|---|
| | Tip: These numbers reflect what the current counts are for this entitlement right now across organizations. |

| Organization Usage: | 6 of the 6 organizations on this Satellite have at least one registered system using this entitlement |
|---|---|

542D

Access Granted by this Entitlement ── 544

A single "Mangament (Base)" entitlement is required to register a system to Satellite

| Your RHN | Systems | Errata | Channels | Configuration | Schedule | Users | Satellite Tools | Help |

NO SYSTEMS SELECTED  [MANAGE]

Satellite Configuration
Organizations
Users
Subscriptions
Task Engine Status

Red Hat Enterprise Linux (core server)   delete organization

Details   Channels   [ Organizations ]

View/Modify Entitlement Counts by Organization

The current allocation of entitlements for Red Hat Enterprise Linux (core server) across the organization on this Satellite is displayed below. You may make changes to the allocation of entitlements for each organization in the "Assign New Total" column, but your changes will not take effect until you confirm them using the "Confirm Change" button below.

Warning: Your proposed entitlement allocation requires more entitlements than are available on this Satellite. Please adjust your proposed allocation below accordingly.

552 — A B C D E F G H I J K L M N O P Q R S T U V W X Y Z 0 1 2 3 4 5 6 7 8 9

Filter by Organization Name: [ 553 ] [ Go! ] 554    555  1-5 of 148  I< < >

Note: Proposed totals must be prefilled with current values.

| Organization Name | Allocated* | In Use* | Proposed Allocation | |
|---|---|---|---|---|
| Acme Corporation | 567 | 600 | [800] Possible Values: 0 to 1500 | Confirm Change |
| [Toy Store] | 118 | 120 | [120] Possible Values: 0 to 1500 | Confirm Change |
| Security Company | 3 | 80 | [800] Possible Values: 0 to 1500 | Confirm Change |
| [Workers Union Local #1337] | 4 | 45 | [45] Possible Values: 0 to 1500 | Confirm Change |
| Strategic Consulting Company | 2 | 55 | [55] Possible Values: 0 to 1500 | Confirm Change |

1-5 of 148  I< < >

Note:
When the user types a value in, check to see if it is > 1500. (sum of all other form values). (where 1500 = total satellite pool of free ents)
If so, use javascript to display a hidden layer with this warning message.

*Tip: "Allocated" refers to the total number of entitlements, either used by a registered system or not, that have been allocated to a particular organization. "In Use" refers to the number of entitlements consumed by a registered You may not allocate an organization less entitlements than it is currently using.

Satellite-Wide Entitlement Counts

557 — Total Allocated: 2400   (Total Not Allocated: 600)
Tip: "Total Allocated" refers to how many entitlements have been allocated to organizations across the Satellite.

558 — Total in Use: 900
Tip: Across organization, this is how many entitlements systems are actually consum 559 — Total Not in Use: 1500
Tip: This is the number of entitlements that have not been allocated to any organization in addition to those entitlements that have allocated but are not in use by a system

FIG. 4N

TRUSTED RELATIONSHIPS IN MULTIPLE ORGANIZATION SUPPORT IN A NETWORKED SYSTEM

COPYRIGHT NOTICE

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright© 2008 Red Hat, Inc.

TECHNICAL FIELD

Embodiments of the present invention relate to support of multiple organizations, and more specifically to supporting trusted relationships between multiple organizations in a networked environment.

BACKGROUND

Conventionally, some software vendors deploy a server to a customer's internal network to manage and to maintain software licensed to the customer. The server may store profiles of the system locally. Typically, the server treats the customer's internal network and computing machines connected thereto as a single entity. In other words, the server manages the internal network, computing machines, and all data within the internal network in only one way. However, even when the customer is a large enterprise having different departments, the server nevertheless treats the entire enterprise as a single entity and manages all departments within the enterprise in the same way. Thus, the server is unable to address different needs of different departments within the enterprise. Furthermore, data security of the enterprise may be compromised because all data is accessible to all departments within the enterprise.

BRIEF DESCRIPTION OF THE DRAWINGS

The present invention is illustrated by way of example, and not by way of limitation, in the figures of the accompanying drawings and in which:

FIG. 3A illustrates one embodiment of a process to provide multiple organization support using a centralized server.

FIG. 3B illustrates one embodiment of a process to segregate data by organizations.

DETAILED DESCRIPTION

Figures 1A, 1B:
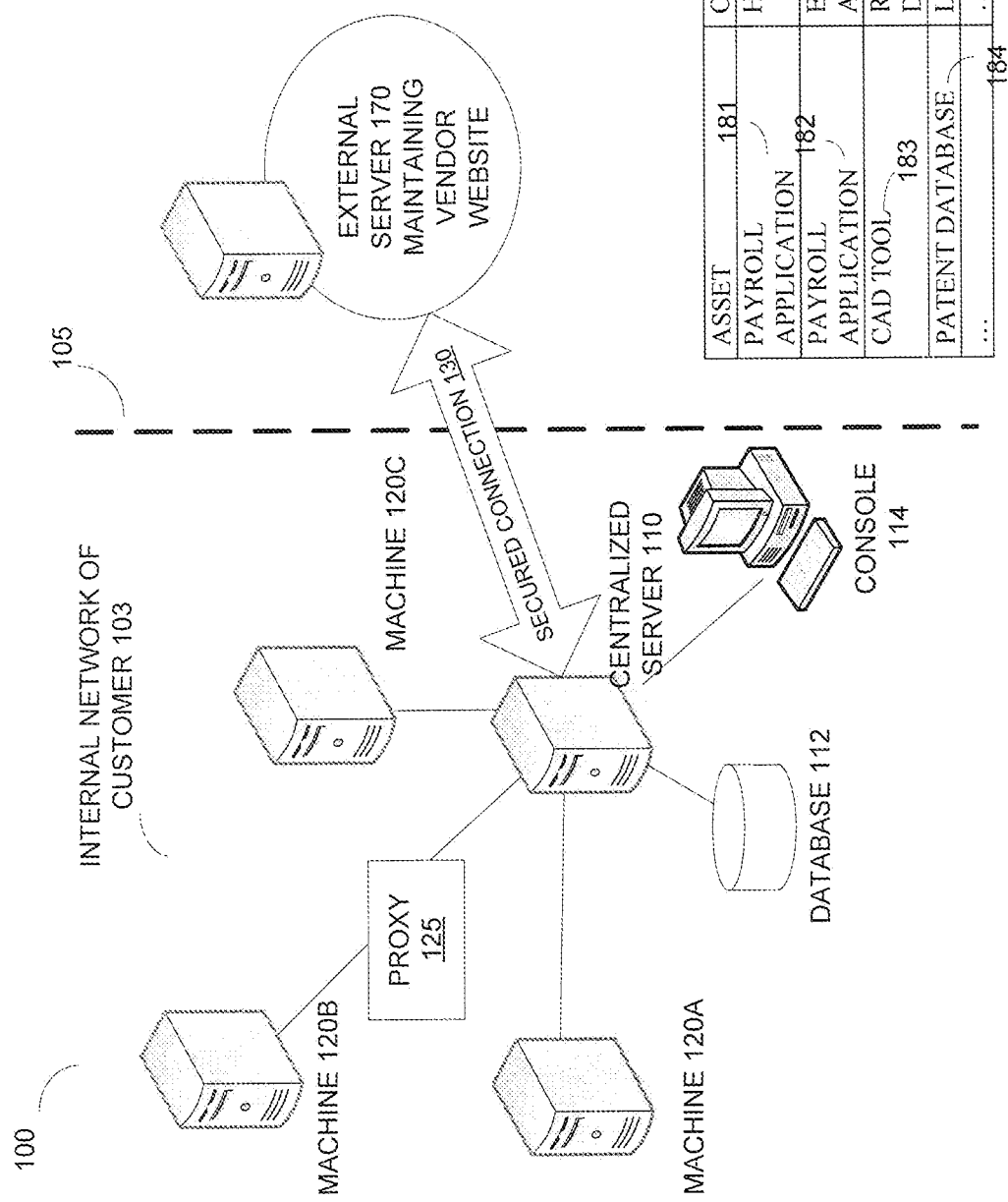
FIG. 1A illustrates one embodiment of a system in which embodiments of the present invention may be implemented.
FIG. 1B illustrates one embodiment of some data stored in an exemplary database.

Described herein are some embodiments of supporting trusted relationships between multiple organizations in a networked system. In one embodiment, a centralized server manages a networked system, which includes the centralized server and a set of computing machines coupled to each other within an internal network of a customer. The centralized server may segregate data and encapsulating resources within the networked system by a set of organizations created by the customer. Furthermore, a trusted relationship defined by a system administrator of the centralized server may be applied to a first one and a second one of the set of organizations. The trusted relationship may also be referred to as a trust between the first one and the second one of the set of organizations. Generally speaking, the trusted relationship defines what can be shared between the first one and the second one of the set of organizations.

In one embodiment, the multiple organization support feature allows the customer to partition the centralized server into different organizations such that each organization has its own set of data, which may include entitlements, content, and provisioning information, etc. Access to a particular organization's set of data is restricted to the particular organization only. In other words, the remaining organizations are restricted from accessing the particular organization's set of data. As such, each organization is its own business or entity without any relation or tie to the other organizations on the centralized server. Such division of resources not only assists in allowing an administrator to manage a more efficient centralized server, but also creates a more secure centralized server by only allowing access to the necessary resources each organization consumes.

In one embodiment, the multiple organization support allows a single vendor to operate in a centralized environment, as well as decentralized management by giving individual third party vendors their own set of resources to manage and maintain under a larger resource set that is owned by the centralized server. This concept of management allows many possibilities, from separate third party vendors to multiple internal departments within a company or an enterprise.

In some embodiments, trusted relationships are supported in the above multi-organization environment. With the addition of trusted relationships between some of the organizations in the networked system, a system administrator may share resources, such as physical systems and software content, between different organizations. The system administrator may define a trusted relationship that applies for either or both system migration and content sharing, while organization administrators define the granularity of which organizations share a specific set of channels. Organizations having a trusted relationship with each other may be referred to as a trusted relationship ring. Having a trusted relationship ring allows an organization administrator of a particular organization the opportunity to trust a specific organization if the organization administrator feels that is appropriate, or allows the organization administrator the opportunity to deny shared resources to a specific organization in the networked system. This concept allows the encapsulation of the actual shared resources to the organization administrator, who best knows how to share the resources the particular organization owns.

In some embodiments, the system administrator may perform the actual management of entitlements across the centralized server, as the system administrator may be more concerned with which organizations are consuming which purchased entitlements at a global level. As used herein, an entitlement is the right to run a copy of the operating system on a single computing machine, which may be a real computing machine or a virtual computing machine. More details of supporting trusted relationship among multiple organizations in a networked system are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1A illustrates one embodiment of a system in which embodiments of the present invention may be implemented. The system 100 includes an external server 170 maintained by a software vendor and an internal network 103 of a customer of the software vendor, coupled to each other via a secured connection 130, such as a virtual private network (VPN) over a public network (e.g., the Internet). Thus, the system 100 may be referred to as a connected setup. Alternatively, the external server 170 and the internal network 103 may not be communicably coupled to each other. Rather, data and information may be loaded onto machine-readable storage media, such as compact discs (CDs), flash memory cards with Universal Serial Bus (USB) connectors, etc. The machine-readable storage media may also be referred to as computer-readable storage media. The machine-readable storage media is then delivered to the customer's site to be loaded onto a centralized server within the internal network. As such, this system may be referred to as a disconnected setup.

In some embodiments, the internal network 103 of the customer further includes components shown on the left side of the dotted line 105. As illustrated in FIG. 1A, the internal network 103 of the customer includes a centralized server 110, a number of computing machines 120A-120C, a proxy 125, a database 112, and a console 114. The computing machines 120A-120C are physical hardware, such as servers, workstations, desktop personal computers (PCs), laptops, etc. The computing machines 120A-120C, the console 114, and the database 112 are coupled to the centralized server 110 within the internal network 103. In some embodiments, one or more of the customer's computing machines may be coupled to the centralized server 110 via a proxy, such as the proxy 125 between the computing machine 120B and the centralized server 110. The proxy 125 may cache software packages to enhance performance, speed up downloads, and offload some of the operations from the centralized server 110.

Unlike some conventional centralized servers, which treat the entire internal network, including computing machines coupled thereto, of a customer as a single organization only, the centralized server 110 allows the customer to create multiple organizations and to manage these organizations independently. In some embodiments, a system administrator may define trusted relationships between these organizations. Organizations within a trusted relationship may share resources, such as physical systems and software content, etc. More details of trusted relationships are discussed below.

In some embodiments, the centralized server 110 generates graphical user interface (GUI) via which the customer may create organizations. Details of some exemplary GUIs are discussed below. After multiple organizations have been created, the centralized server 110 associates data in the internal network 103 with its respective organizations in some embodiments. As mentioned above, the data may include various types of data of the customer's internal network 103 and computing machines 120A-120B, such as entitlements, content, and provisioning information, etc. The centralized server 110 may further store the data into the database 112 and instructs the database 112 to organize the data stored by the respective organizations. In some embodiments, the database 112 includes a relational database. Alternatively, the database 112 may include a flat file database. Note that support of trusted relationships between organizations as discussed below may be pertinent to the relational database or the flat file database. FIG. 1B illustrates one embodiment of some data stored in the database 112.

Referring to FIG. 1B, the data includes a number of entries, such as entries 181-184, to represent various assets of a customer, including applications installed in an internal network and/or computing machines of the customer. In the current example, the customer is a company having various departments. Organizations have been created to correspond to the departments, such as human resources department, research and development department, legal department, etc. Entry 181 represents payroll application, which is associated with the organization of human resources. Entry 182 represents employment applicant database, which is also associated with the organization of human resources. Entry 183 represents a computer aided design (CAD) tool, which is associated with the organization of research and development department. Entry 184 represents a patent database, which is associated with the organization of legal department. As shown in FIG. 1B, the entries 181-184 of various assets are organized by their respective organizations. The entries 181-184 may be segregated by the organizations. Thus, the assets represented by the entries 181-184 may be managed by their respective organizations independently. Moreover, access to various assets may be restricted to their associated organizations only. For example, when a user of the research and development department attempts to access the payroll application, the attempt may be denied because the user does not belong to the human resource department. In some embodiments, different types of access may be allowed depending on the organizations. For example, a user of the research and development department may be allowed to view the patent database, but not to modify the patent database, whereas a user of the legal department may be allowed to both view and modify the patent database.

Referring back to FIG. 1A, the internal network 103 includes a local area network (LAN) protected from unauthorized access. For instance, a firewall may be employed at a gateway or proxy of the LAN to prevent unauthorized access to the LAN. Through the secured connection 130, the centralized server 110 within the internal network 103 may access the external server 170 external to the internal network 103. For example, the external server 170 may host a website of the software vendor and the centralized server 110 may establish the secured connection 130 to the website using one or more Internet security protocol (e.g., secure socket layer (SSL), secure shell (SSH), transport layer security (TLS), etc.). Thus, the centralized server 110 may securely retrieve or download various items from the external server 170, such as items that are available only by purchase and/or license (e.g., metadata of an operating system, such as Red Hat Enterprise Linux provided by Red Hat, Inc. of Raleigh, N.C., information on provisioning, executables of client applications, etc.). The items retrieved are stored locally within the customer's internal network 103. In one embodiment, the items retrieved are stored in a storage device internal to the centralized server 110. Alternatively, the items retrieved may be stored in the database 112 coupled to the centralized server 110 within the internal network 103. Alternatively, the items retrieved may be stored in a Network-Attached Storage (NAS) device. After downloading the items from the external server 170, the centralized server 110 may terminate the secure connection 130 such that no talk back to the external server 170 is allowed. As such, the above approach allows the customer to take the customer's system off the external network (e.g., the Internet), and hence, providing more optimization, flexibility, and control of the system to the customer.

The centralized server 110 may synchronize with the external server 170 by checking with the external server 170 for updates and/or changes to the items retrieved previously. Such synchronization may be performed periodically and/or in response to user requests. Alternatively, the external server 170 may notify the centralized server 110 when there are changes and/or updates to the items previously provided to the centralized server 110. When there is a change to an item previously retrieved, the centralized server 110 may retrieve the change from the external server 170 and then update a copy of the item on the centralized server 110 accordingly, or the centralized server 110 may simply retrieve an updated version of the item to replace the previously retrieved version. In some embodiments, synchronization is performed via one or more channels within the secured connection 130 between the centralized server 110 and the external server 170. A channel as used herein refers to a collection of software packages organized into a logical grouping. For example, the set of packages that make up an operating system is organized into a channel in some embodiments. Different types of items may be associated with different channels such that the centralized server 110 may choose to synchronize a subset of the channels as needed. For example, information related to provisioning virtual hosts and virtual guests may be associated with a Tool channel.

Alternatively, the centralized server 110 may synchronize with the external server 170 via machine-readable storage media, such as CDs, flash memory cards with USB connectors, etc. The machine-readable storage media may also be referred to as computer-readable storage media. When there is a change to an item previously provided to the centralized server 110, the change to the item or an updated version of the item may be stored onto the machine-readable storage media from the external server 170. Then the machine-readable storage media may be delivered to the customer, who would provide the machine-readable storage media to the centralized server 110. By providing the machine-readable storage media to the centralized server 110, the centralized server 110 obtains the metadata and information from the machine-readable storage media and subsequently, uses the metadata and information to manage the computing machines 120A-120C as well as the virtual hosts and virtual guests provisioned on the computing machines 120A-120C.

Figure 2:
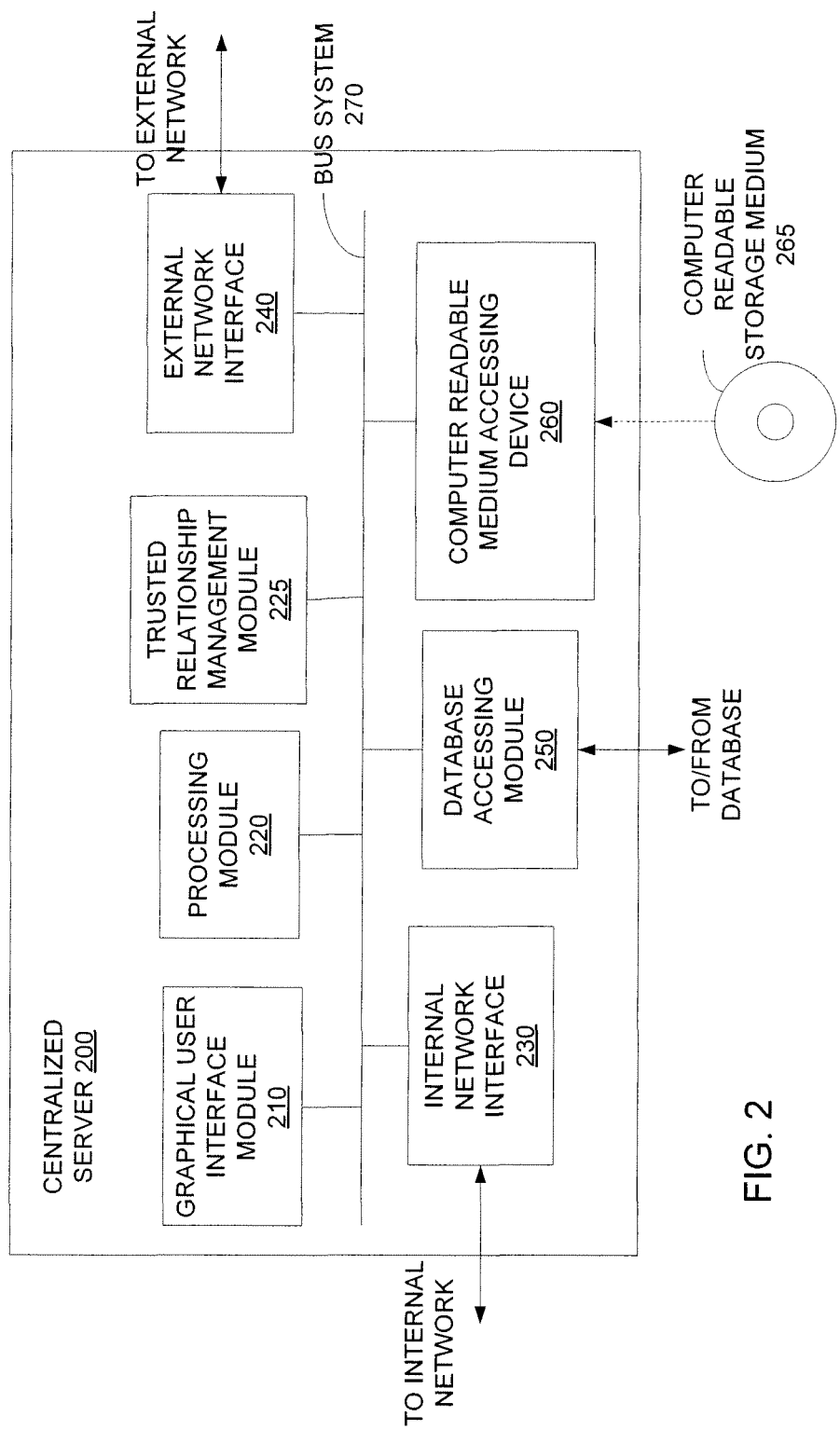
FIG. 2 illustrates a functional block diagram of one embodiment of a centralized server.

FIG. 2 illustrates a functional block diagram of one embodiment of a centralized server. The centralized server 200 includes a graphical user interface (GUI) module 210, a processing module 220, a trusted relationship management module 225, an internal network interface 230, an external network interface 240, a database accessing module 250, and a computer-readable medium accessing device 260, which are coupled to each other via a bus system 270.

In some embodiments, the centralized server 200 is communicably coupled to an internal network of a customer of a software vendor via the internal network interface 230. The internal network further includes one or more physical computing machines of the customer, such as servers, workstations, desktop PCs, laptops, etc. The centralized server 200 is further coupled to an external network, such as the Internet, via the external network interface 240. The external network interface 240 may establish a secured connection to access a external server provided by the software vendor (such as the external server 170 in FIG. 1A) to retrieve various items from the external server, such as metadata of an operating system, information on provisioning virtual hosts and virtual guests, application upgrades, etc. These items retrieved may be stored locally within the internal network.

Alternatively, the centralized server 200 may obtain the metadata of an operating system, information on provisioning virtual hosts and virtual guests, application upgrades, etc., from a computer-readable storage medium 265 removably coupled to the computer-readable medium accessing device 260. Some examples of the computer-readable storage medium 265 and computer-readable storage medium accessing device 260 include a CD and a CD-ROM drive, a flash memory card with a USB connector and a USB drive, etc. The external server of the software vendor may store the metadata of an operating system, information on provisioning virtual hosts and virtual guests, application upgrades, etc., onto the computer-readable storage medium 265, which is then delivered to the customer for the centralized server's 200 use.

In some embodiments, the centralized server 200 further includes the GUI module 210. The GUI module 210 is operable to generate a GUI to allow users to create organizations. Some exemplary GUIs are discussed in details below. Based on the input by the users via the GUI, the processing module 220 creates these organizations and associates data with the respective organizations. In one embodiment, the database accessing module 250 stores the data as entries into a database. The entries are organized by the organizations in the database. One embodiment of some entries is shown in FIG. 1B discussed above. As such, the data is segregated by organizations so that the processing module 220 may manage the data of one organization independent of the other organizations.

In some embodiments, the centralized server 200 further includes the trusted relationship management module 225 to manage trusted relationships of organizations defined by a system administrator. In some embodiments, the trusted relationship management module 225 is separate from the processing module 220 as shown in FIG. 2. Alternatively, the trusted relationship management module 225 may be part of the processing module 220. Using trusted relationships, the system administrator may share various resources (e.g., hardware in system migration, software channels, etc.) between different organizations. In one embodiment, the system administrator defines a trusted relationship that applies for either or both system migration and content sharing while the organization administrators define the granularity of which organizations share specific channels. Once a trusted relationship has been established, organizations within the trusted relationship may perform operations, such as sharing channels and migrating systems with each other, based on definitions of the trusted relationship.

In some embodiments, the trusted relationship management module 225 allows a system administrator to configure the trusted relationship between organizations. For example, the system administrator may have the option to configure a trusted relationship as relating to channel sharing only, system migration only, or both channel sharing and system migration. Furthermore, trusted relationships may be bi-directional. If system migration is enabled in a trusted relationship between organizations A and B, then organization A can migrate systems to organization B, and vice versa. Likewise, if content sharing is enabled in the trusted relationship between organizations A and B, then organization A can access shared channels from organization B, and vice versa.

In some embodiments, a trusted relationship can be set up with a single organization, multiple organizations, or all organizations within the networked system. Initially, a trusted relationship may default to none. Then the system administrator may add organizations to the trusted relationship via GUIs generated by the GUI module 210. Some embodiments of the GUIs generated are discussed below with respect to FIGS. 5A-5D. A trusted relationship set up with all organizations includes all future organizations (i.e., organizations to be created after the trusted relationship has been set up). In other words, the trusted relationship set up with all organizations is not the current "snapshot" of organizations at the time of creation.

In some embodiments, trusted relationships are of lower precedence than channel sharing properties. Thus, if a channel is designated as a private channel in a particular organization within a trusted relationship set up with all organizations, other organizations still cannot access the private channel. More details of some embodiments of the logic to implement the above mechanism are discussed below with reference to FIG. 3C. Although some embodiments of trusted relationships may allow sharing of all resources, other embodiments of trusted relationship may prohibit sharing of a predetermined set of resources (e.g., kickstart profiles, configuration channels, etc.).

In some embodiments, each individual trusted relationship is unique and mutually exclusive from other organizations' trusted relationships. For example, if organization Org2 trusts organization Org3, and organization Org1 trusts Org2, then Org1 will not trust Org3 unless a trusted relationship is defined between Org1 and Org3, or Org1 trusts all organizations. In another exemplary scenario, there are ten (10) organizations, namely, Org1, Org2, . . . , and Org10. A system administrator provisions the following trusted relationships:
Trusted Relationship 1: Org1+Org2+Org3;
Trusted Relationship 2: Org4+Org5, system migration only, no channel sharing;
Trusted Relationship 3: Org3+Org4;
Trusted Relationship 4: Org7 trusts all organizations.
In the above exemplary scenario, Org1 may share channels with and/or migrate systems to Org2 and Org3. Org2 may share channels with and/or migrate systems to Org1 and Org3. Org3 may share channels with and/or migrate systems to Org1, Org2, and Org4. Org4 may migrate systems to Org5, but Org4 may not share channels with Org5. Org4 may share channels with and/or migrate systems to Org3. Org5 may migrate systems to Org4, but Org5 may not share channels with Org4. Org6-Org10 do not have permission to share channels or migrate systems with any organization. Org1-Org5 do not have permission to share channels or migrate systems with Org6-Org10.

In some embodiments, the channel sharing capability may apply only to custom or cloned channels. Note that some channels, such as official channels from the software vendor, may already be shared across organizations. The system administrator may enable content sharing by allowing a trusted relationship to occur between specific organizations. An organization administrator of a particular organization may select which channels to share within a trusted relationship. If a channel being shared has a parent channel, which is a custom channel, the parent must also be shared according to one embodiment of the invention. If the channel being shared has a parent channel, which is a base channel, the shared channel may only be in the channel list of organizations that have a compatible base channel. For any channel that has been shared, all errata and packages associated with that channel may also be shared, enabling them to appear in the trusted organization user interface pages as well as available via search and application programming interface (API). Custom channels may still be created as private channels and only become public if explicitly shared. In some embodiments, shared custom or cloned channels are read only in all organizations except the one they were originally created in. The user interface may clearly display what organization shared a channel and the organization administrator who shares it.

In some embodiments, a channel list user interface includes the following channel filters:

All Channels: list all channels except retired channels;

Popular Channels: list channels that have at least one system registered to them, sorted in parent channel order of greatest to least number of systems registered, with a drop down menu at the top where a user can select: "View channels with [no|<10|<50|<100|<500|<1000|1000+] systems registered."

Vendor Channels: list all channels provided by the software vendor;

My Channels: list all cloned and custom channels;

Shared Channels: has two tabs:
  Channels to share: list of channels shared by the organization; and
  Channels shared with me: list of channels made available from other organizations;

Retired Channels: list channels previously provided by the software vendor, but are no longer supported.

In some embodiments, organization and channel administrators are allowed to revert a public channel to private status at any time. As the public channel is being reverted to private, it is unshared. An unshared channel may continue to be listed within organizations that have at least one system subscribed to it. In this case, the channel may no longer be available for updates to systems in that organization, and the channel may appear disabled (e.g., grayed out) in the user interface. As such, the organization administrators may be alerted to take the appropriate action, if any. Once there are no more systems subscribed to that channel within the organization, the channel may no longer appear in the organization's channel list.

Furthermore, channel status may also be affected by organizations that are removed from the sharing organization's trusted relationship. If the channel being unshared is a parent to another channel that is being shared (i.e., the child channel is being shared), the child channel must also be made private according to one embodiment of the invention.

In addition to channel sharing, trusted relationships may allow system migration between organizations. In some embodiments, organization administrators perform system migration according to the trusted relationships defined. Systems may be migrated to any other organization that is trusted. Migration may be performed via an API call. In one embodiment, migration removes all associations with objects in the old organization and the system with its history is being migrated over to the new organization. However, the trusted relationship management module 225 may return entitlements to the old organization. Furthermore, migration may remove channels, system groups, virtual guest associations (as a result of which, guests may remain in old organization as unaffiliated virtual systems), monitoring probes, and configuration channels from the old organization.

In some embodiments, a migration APT call accepts an activation key in the new organization. The administrator of the new organization may have to provide the activation key manually. Entitlements on activation keys may be applied if there are available entitlements in the new organization. If an entitlement cannot be applied, the system may be unentitled. In some embodiments, migration occurs immediately without any moderation queue. An event may appear in the system history indicating that this system has been migrated from another organization. By allowing system migration between organizations within a trusted relationship, systems that are no longer needed in one organization can be migrated to another organization having a trusted relationship with the one organization. As such, the overall efficiency in system usage is improved.

FIG. 3A illustrates one embodiment of a method to provide multiple organization support using a centralized server. The method may be performed by processing logic that may comprise hardware (e.g., circuitry, dedicated logic, programmable logic, microcode, etc.), software (such as instructions run on a processing device), firmware, or a combination thereof. For example, the processing module 220 and the trusted relationship management module 225 of the centralized server 200 shown in FIG. 2 may perform at least part of the method.

Initially, processing logic generates GUIs to allow a customer to create organizations, update organizations created, delete organizations created, and/or define trusted relationships between organizations (processing block 310). For example, in one embodiment, processing logic may generate a GUI to allow an administrator of a particular organization to update information of the organization. In one embodiment, processing logic may generate user interface control (e.g., a button) in the GUI to allow the administrator to delete an organization when the organization is no longer relevant. In some embodiments, processing logic allows deletion of organizations one organization at a time. Referring to the above example, where the centralized server serves a company with many departments, a first department may be deleted when the first department is merged into a second department. Alternatively, processing logic allows deletion of multiple organizations substantially simultaneously. For instance, where the centralized server serves a managed hosting service provider providing rack space, the provider may need to disable multiple non-paying accounts in each billing cycle on a regular basis. Then processing logic segregates data by the organizations to isolate the organizations (processing block 315). One embodiment of a method to segregate data is discussed in details below. Then processing logic applies trusted relationships defined to the organizations (processing block 318). Based on the trusted relationships defined, processing logic may allow or prohibit channel sharing and/or system migration between the organizations. One exemplary embodiment of application of trusted relationship is discussed in detail below with reference to FIG. 3C.

In some embodiments, processing logic allows each organization to access only its associated data (processing block 320). An organization's associated data may include the organization's own data as well as data of other organizations having a trusted relationship with the organization. Processing logic prevents the organizations to access data not associated with the respective organizations (processing block 325).

FIG. 3B illustrates one embodiment of a method to segregate data by organizations. The method may be performed by processing logic that may comprise hardware (e.g., circuitry, dedicated logic, programmable logic, microcode, etc.), software (such as instructions run on a processing device), firmware, or a combination thereof. For example, the processing module 220 of the centralized server 200 shown in FIG. 2 may perform at least part of the method.

Processing logic represents data of a customer's internal network and/or computing machines with entries in a database (processing block 330). The data may include entitlements, applications, provisioning information, etc. Then processing logic associates the entries with the respective organizations based on customer input (processing block 335). For example, the customer may have provided information on various organizations when creating the organizations, such as the number of entitlements allowed to an organization, the level of the right to access certain applications, etc. Then processing logic may store the entries by the organization in the database (processing block 340).

Figure 3C:
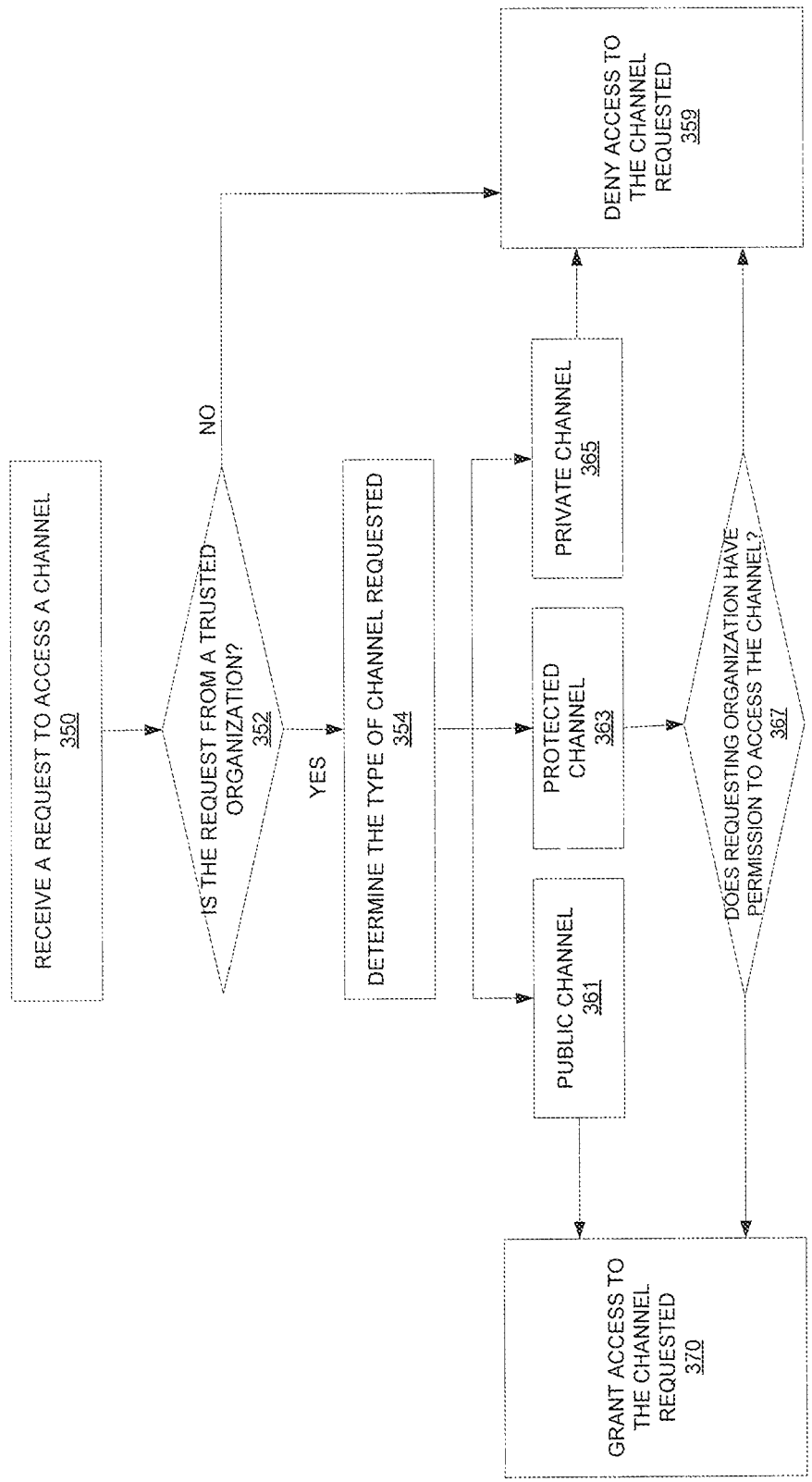
FIG. 3C illustrates one embodiment of a process to apply trusted relationships between organizations.

FIG. 3C illustrates one embodiment of a method to apply trusted relationships to organizations with respect to channel sharing. The method may be performed by processing logic that may comprise hardware (e.g., circuitry, dedicated logic, programmable logic, microcode, etc.), software (such as instructions run on a processing device), firmware, or a combination thereof. For example, the trusted relationship management module 225 of the centralized server 200 shown in FIG. 2 may perform at least part of the method.

Referring to FIG. 3C, processing logic receives a request to access a channel (processing block 350). Processing logic then determines if the requesting organization is on the list of trusted organizations of the organization owning this channel (processing block 352). If not, then processing logic denies the request organization access to the channel (processing block 359). Otherwise, processing logic determines the type of the channel (processing block 354). In some embodiments, there are three possible types, namely, a public channel, a protected channel, and a private channel. If processing logic determines that the channel requested is a public channel, then processing logic transitions to block 361. Processing logic then grants access to the channel to the requesting organization (processing block 370). If processing logic determines that the channel requested is a private channel, then processing logic transitions to block 365. Processing logic then denies access to the channel to the requesting organization (processing block 359). If processing logic determines that the channel requested is a protected channel, then processing logic transitions to block 363. Processing logic then determines if the requesting organization has been granted permission to access the channel requested (processing block 367). If so, then processing logic grants access to the channel to the requesting organization (processing block 370). Otherwise, processing logic then denies access to the channel to the requesting organization (processing block 359).

FIG. 4A illustrates one embodiment of a GUI to create a new organization. The GUI 410 provides a field 412 for entering an organization name, such as "sales department." The GUI 410 further allows creation of an organization administrator for this new organization. In one embodiment, the GUI 410 provides a field 414 to allow entry of a login name of the organization administrator, such as "sales-admin." The GUI 410 further provides a field for entering a password of the organization administrator and another field 418 for confirming the password.

Figure 4B:
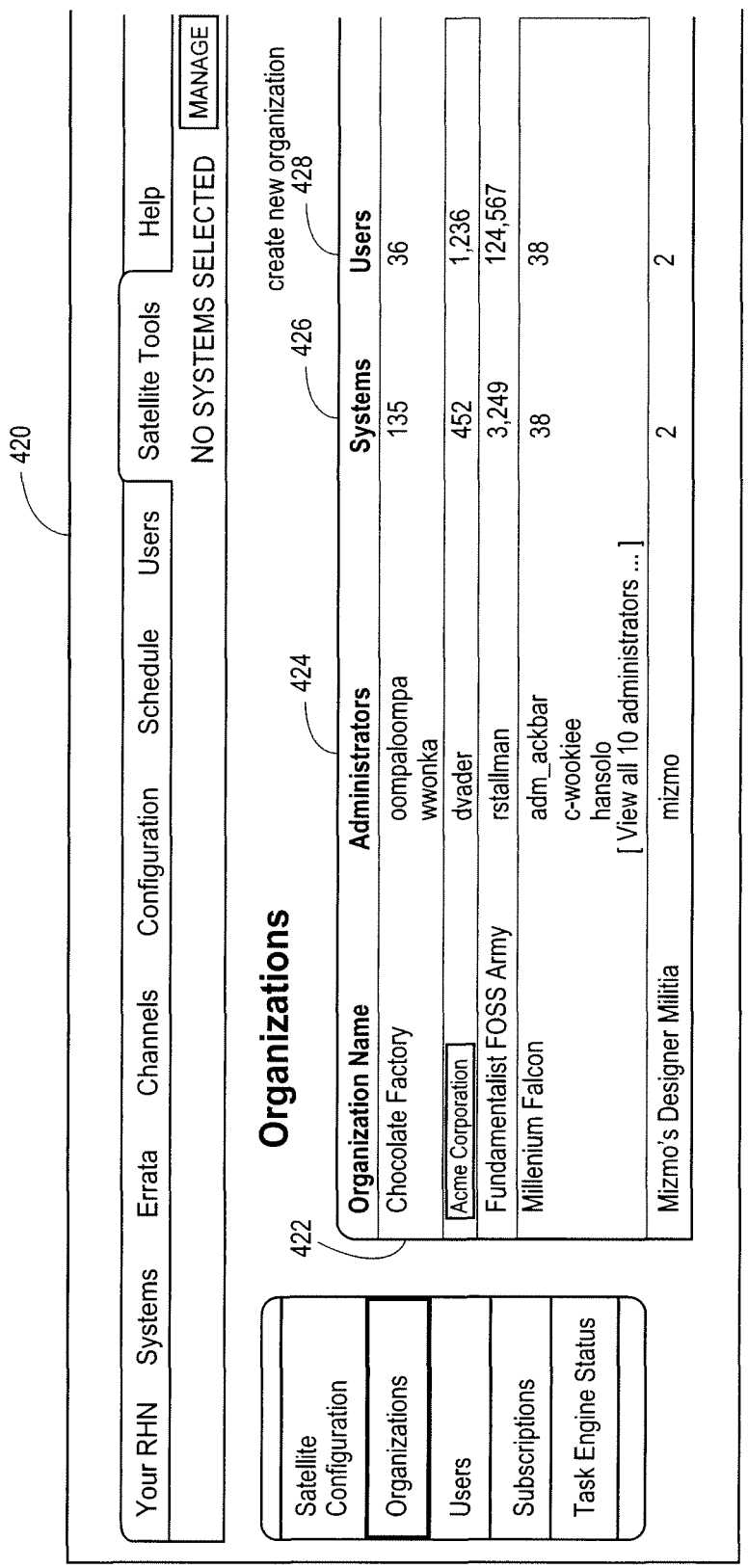
FIGS. 4A-4N illustrate some embodiments of some graphical user interfaces.

FIG. 4B illustrates one embodiment of a GUI to show a list of organizations available on a centralized server. The organizations 422 in the GUI 420 are organizations created and not yet deleted. The GUI 420 further shows some information of the organizations, include a list of organization administrators 424, number of systems used 426, and number of users 428 of each organization.

Figure 4C:
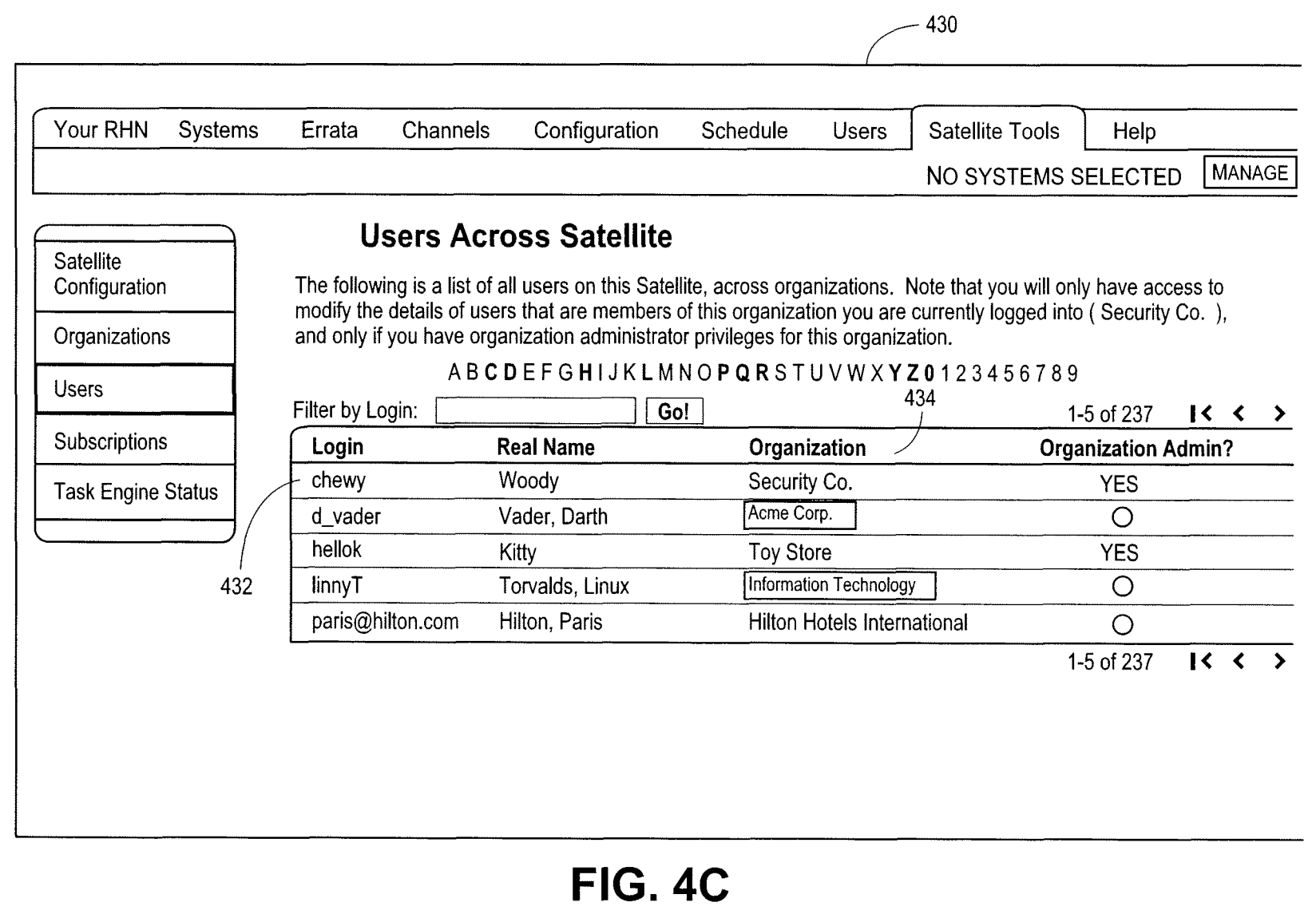

FIG. 4C illustrates one embodiment of a GUI showing a list of users across multiple organizations. The GUI 430 shows a list of users 432 on a centralized server and their corresponding organizations 434.

FIG. 4D illustrates one embodiment of a GUI showing a list of software channel entitlements across multiple organizations. The GUI 440 shows a list of software channel entitlements 442 and their corresponding numbers of entitlements allocated 444, not allocated 446, and not in use 448. In one embodiment, the number of entitlements allocated 444 refers to the total number of entitlements, whether used by a registered system or not, that have been allocated to a particular organization. The number of entitlements not allocated 446 may refer to the number of entitlements that are not allocated to any organization. The number of entitlements not in use 448 refers to entitlements that have been allocated to an organization but are not currently consumed by a system.

FIG. 4E illustrates one embodiment of a GUI showing a list of system entitlements across multiple organizations. The GUI 450 shows a list of entitlement names 452 and their corresponding numbers of entitlements allocated 454, not allocated 456, and not in use 458. In one embodiment, the number of entitlements allocated 454 refers to the total number of entitlements, whether used by a registered system or not, that have been allocated to a particular organization. The number of entitlements not allocated 456 may refer to the number of entitlements that are not allocated to any organization. The number of entitlements not in use 458 refers to entitlements that have been allocated to an organization but are not currently consumed by a system.

FIG. 4F illustrates one embodiment of a GUI showing details of an exemplary organization, Acme Corporation. In the current examples, the centralized server serves a company having multiple organizations. The GUI 460 shows the name of the company 461, the name of the organization 462, a list of organization administrators 463, and various statistics of the organization. In one embodiment, the statistics includes the number of active users 464 in the organization, the number of systems 465 used by the organization, the number of system groups 466, the number of activation keys 467 the organization has, the number of kickstart profiles 468 associated with the organization, and the number of configuration channels 469 of the organization.

FIG. 4G illustrates one embodiment of a GUI showing a list of all users in the exemplary organization, Acme Corporation. The GUI 470 shows a list of login names 472 of all users in the organization of Acme Corporation, their respective real names 474, and an indication 476 of whether a particular user is an organization administrator. In one embodiment, a user may modify the details of these users 472 if the user is logged into the organization of Acme Corporation and has organization administrator privileges. For instance, Woody 472a and Kitty 472c are allowed to modify the details of the users 472 in the current example.

Figure 4H:
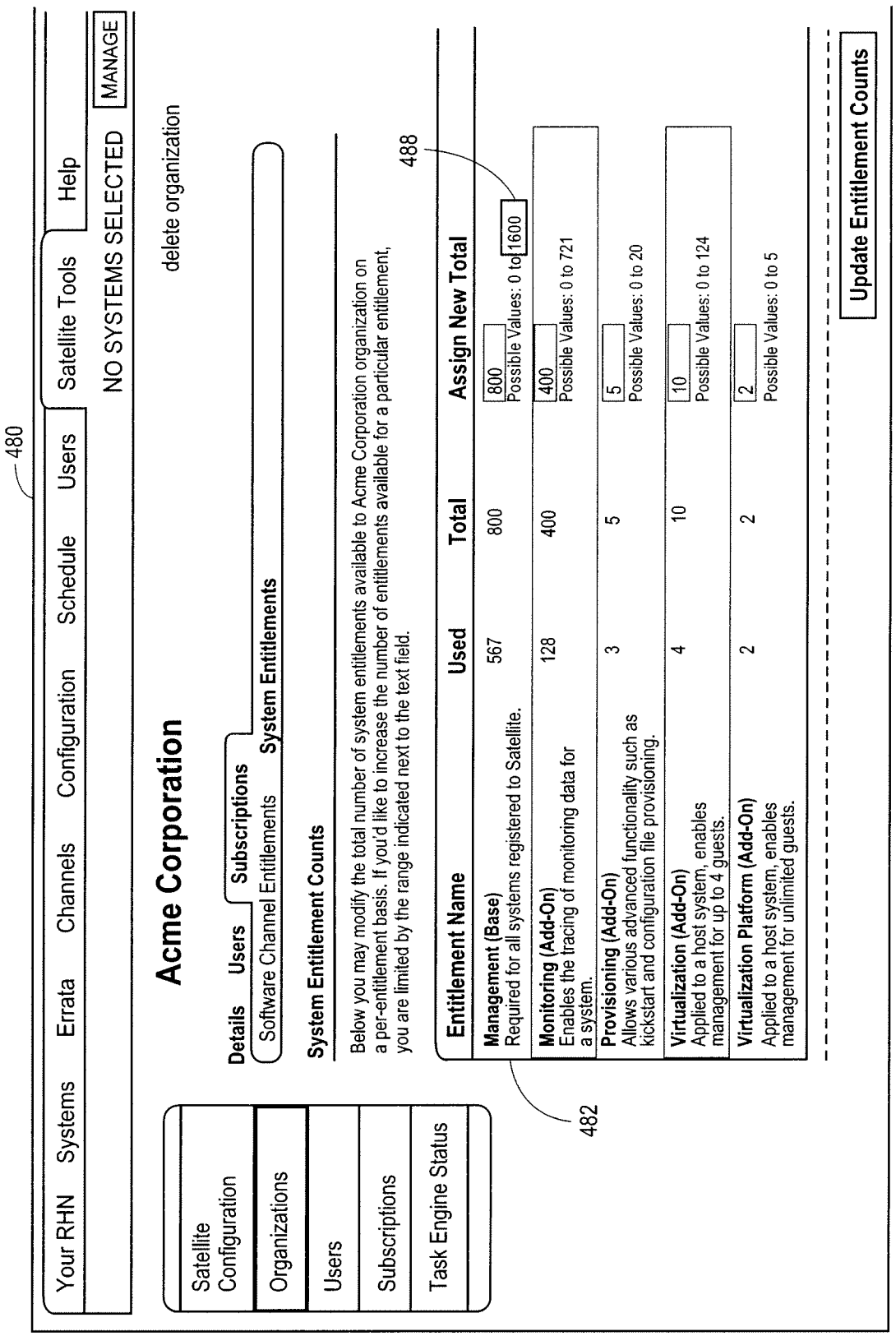

FIG. 4H illustrates one embodiment of a GUI showing details of the system entitlements of the exemplary organization, Acme Corporation. The GUI 480 shows a list of system entitlements 482 available to the organization of Acme Corporation. The organization administrator may modify the total number of system entitlements available to the organization of Acme Corporation on a per-entitlement basis via the GUI 480. In one embodiment, the number of entitlements available for a particular entitlement may be increased, limited to the range 488 indicated next to the text field.

FIG. 4I illustrates one embodiment of a GUI showing details of the software channel entitlements of the exemplary organization, Acme Corporation. The GUI 490 shows a list of software channel entitlements 492 available to the organization of Acme Corporation. The organization administrator may modify the total number of system entitlements available to the organization of Acme Corporation on a per-channel basis via the GUI 490. In one embodiment, the number of entitlements available for a particular entitlement may be increased, limited to the range 498 indicated next to the text field.

FIG. 4J illustrates one embodiment of a GUI showing details of an exemplary user, dv4d3r. The GUI 510 shows both user details 512 and account details 514 of the exemplary user. In one embodiment, the user details 512 include the title 512a, the first name 512b, the last name 512c, the email 512d, and the position 512e of the exemplary user. In one embodiment, the account details 514 include the login name 514a, the company name 514b, the organization name 514c, the roles of the user 514d, and the time and date the account is created 514e. In one embodiment, a user may edit the information on this GUI 510 if the user has organization administrator privileges for this user's organization and is logged into that organization.

FIG. 4K illustrates one embodiment of a GUI showing systems associated with the exemplary user, dv4d3r. The GUI 520 shows a list of systems 522, in which the exemplary user dv4d3r, has registered and/or has administrative access. The GUI 520 further shows the internet protocol (IP) address 524 and the relationship of the user to the respective system 526 in the GUI 520.

FIG. 4L illustrates one embodiment of a GUI showing details of an exemplary software channel entitlement of an organization. The GUI 530 shows the entitlement usage 532 and access granted by this entitlement 534. In one embodiment, the entitlement usage 532 includes the total number of entitlements 532A, the number of entitlements used 532B, the number of free entitlements 532C, and organization usage 532D. In one embodiment, the list 534 includes software channels to which a single "Red Hat Enterprise Linux (core server)" entitlement may be used to gain access to.

FIG. 4M illustrates one embodiment of a GUI showing details of an exemplary system entitlement of an organization. The GUI 540 shows the entitlement usage 542 and access granted by this entitlement 544. In one embodiment, the entitlement usage 542 includes the total number of entitlements 542A, the number of entitlements used 542B, the number of free entitlements 542C, and organization usage 542D. In one embodiment, the details shown under the access granted by this entitlement 544 comes from the organization object's entitlement list.

FIG. 4N illustrates one embodiment of a GUI to allow organization administrators to view and/or modify entitlement counts by organization on a centralized server. The GUI 550 displays a list of organizations 552, along with the number of entitlements allocated 553, the number of entitlements in use 554, and a field for entry of the number of proposed allocation 555. In one embodiment, the field 555 is initially filled with the existing number of entitlements allocated. The organization administrator may modify the count in the field 555. However, lowering the proposed allocation to be less than the number of entitlements in use 554 may trigger a warning in some embodiments. In one embodiment, the GUI 550 further displays a total number of entitlements allocated 557 on the centralized server, the total number of entitlements in use 558 on the centralized server, and the total number of entitlements not in use 559 on the centralized server.

Figure 5A:
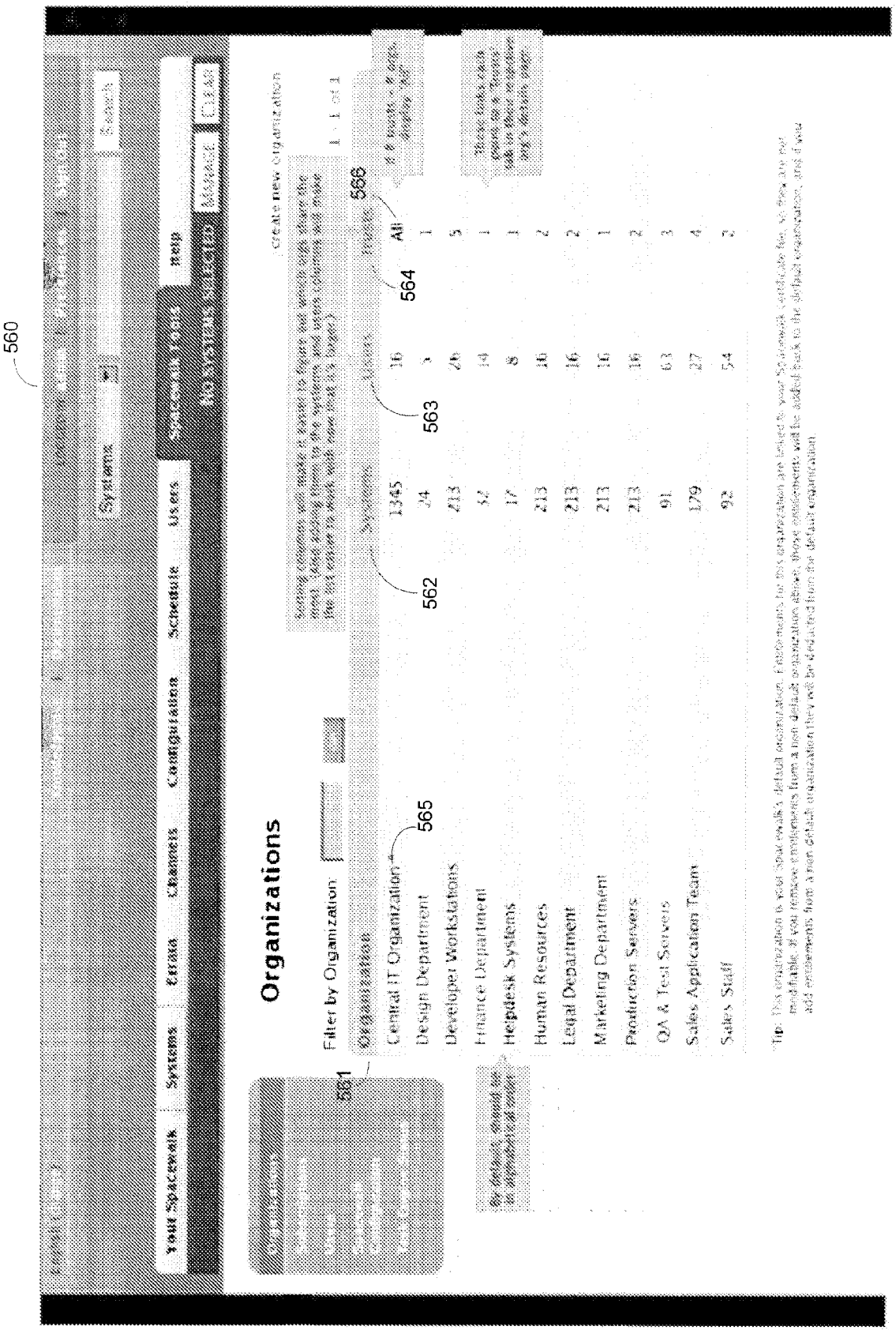
FIGS. 5A-5D illustrate some embodiments of some graphical user interfaces.

FIG. 5A-5D illustrates some embodiments of GUIs related to supporting trusted relationships. FIG. 5A illustrates one embodiment of a GUI 560 to allow organization administrators to view the number of systems 562, users 563 and trusts 564 of organizations on a centralized server of a networked system. The GUI 560 lists the organizations 561 alphabetically by default. A system administrator may choose to sort the organizations 561 by the number of systems 562, users 563 and/or trusts 564. If the number of trusts of an organization is the same as the total number of organizations in the networked system, such as Central IT Organization 565, then the GUI 560 displays "All" 566 on the line of the organization in the trusts column 564. In some embodiments, each number in the trusts column 564 links to a "trusts" tab in its respective organization's detail page.

Figure 5B:
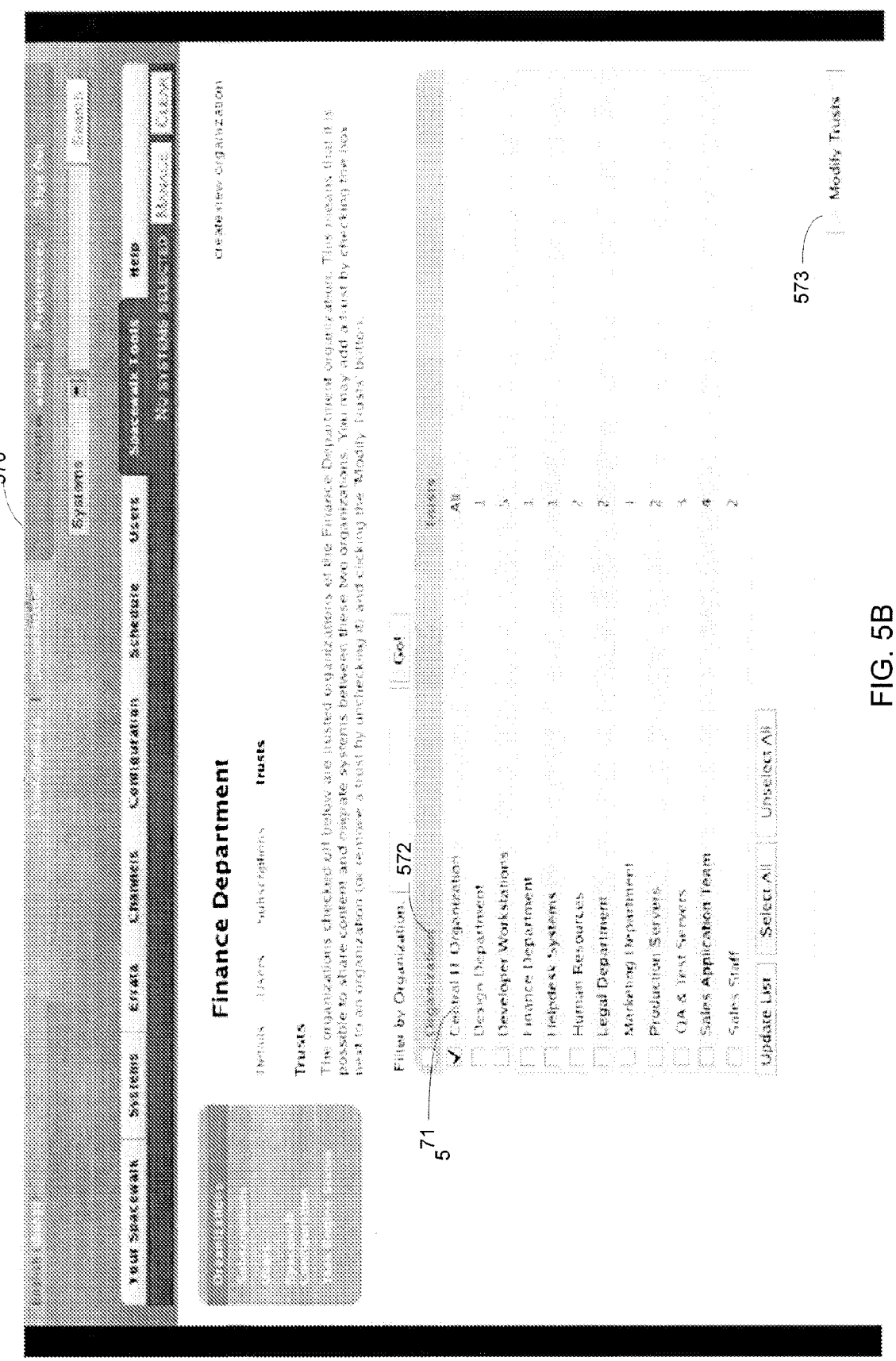

FIG. 5B illustrates one embodiment of a GUI 570 to allow system administrators to view and modify the trusts associated with a particular organization, such as Finance Department in the current example. Trusted organizations of Finance Department are checked off in the GUI 570, such as Central IT Organization 571. To modify or update the list of trusted organizations, the system administrator may check off additional organizations in the list of organizations 572, or unselect organizations that are previously checked off, and then actuate the "Modify Trusts" button 573.

Figure 5C:
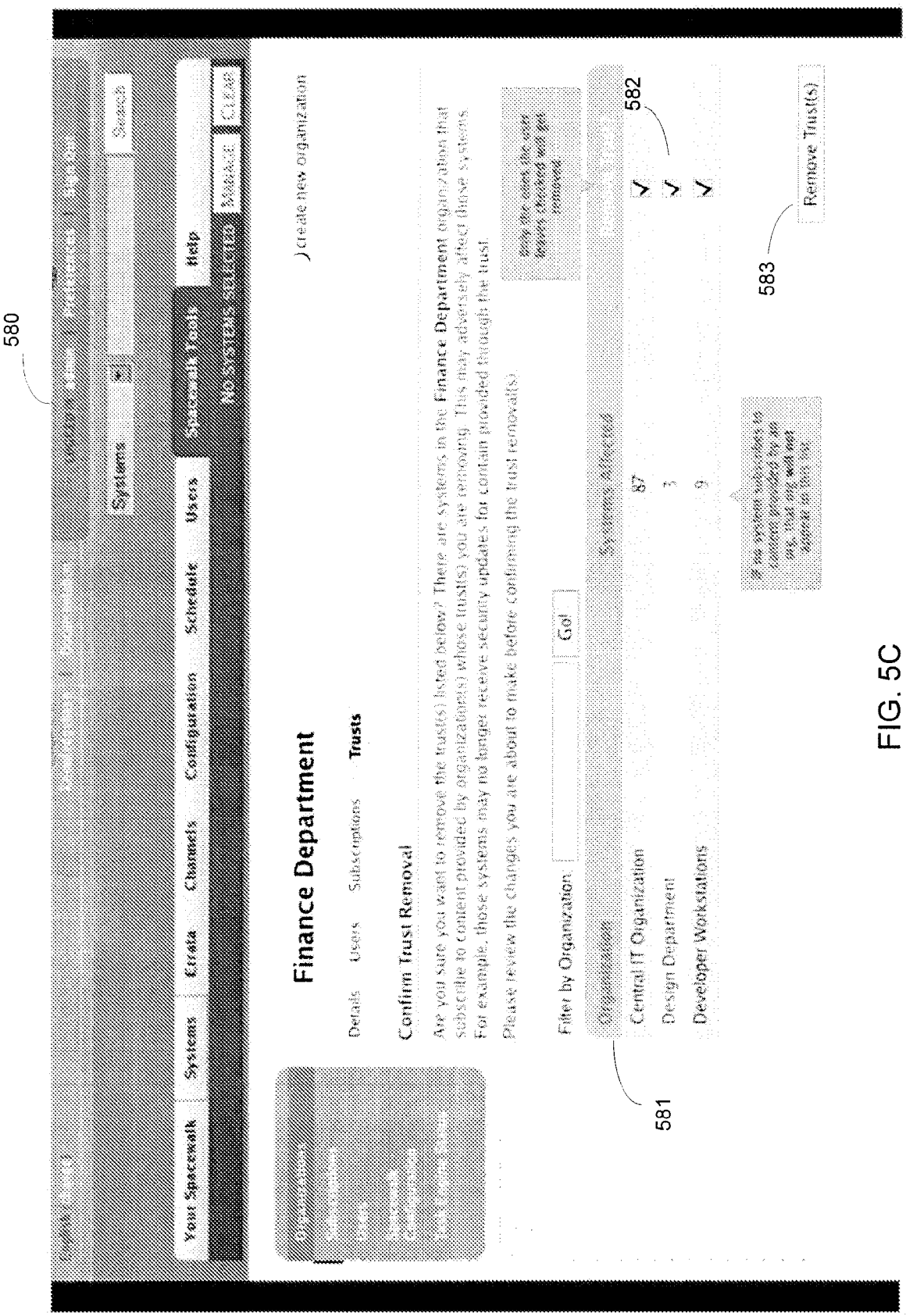

FIG. 5C illustrates one embodiment of a GUI 580 to display organizations whose trust a current organization relies on for system content. Similar to the above example, the organization of interest here is Finance Department. If there is no system currently subscribing to the content provided by Finance Department, that organization will not appear in the list of organizations 581. To remove a trust, a system administrator may check off the corresponding one(s) of organizations 582, and then actuate the "Remove Trust(s)" button 583. Note that there may be systems in the Finance Department that subscribes to content provided by organizations whose trusts are being removed. This may adversely affect those systems. For example, those systems may no longer receive security updates for content provided through the trust. Therefore, by reviewing the list of organizations 581 in the GUI 580, the system administrator may avoid inadvertently removing a trust having systems that depend on the trusted relationship being there for content.

Figure 5D:
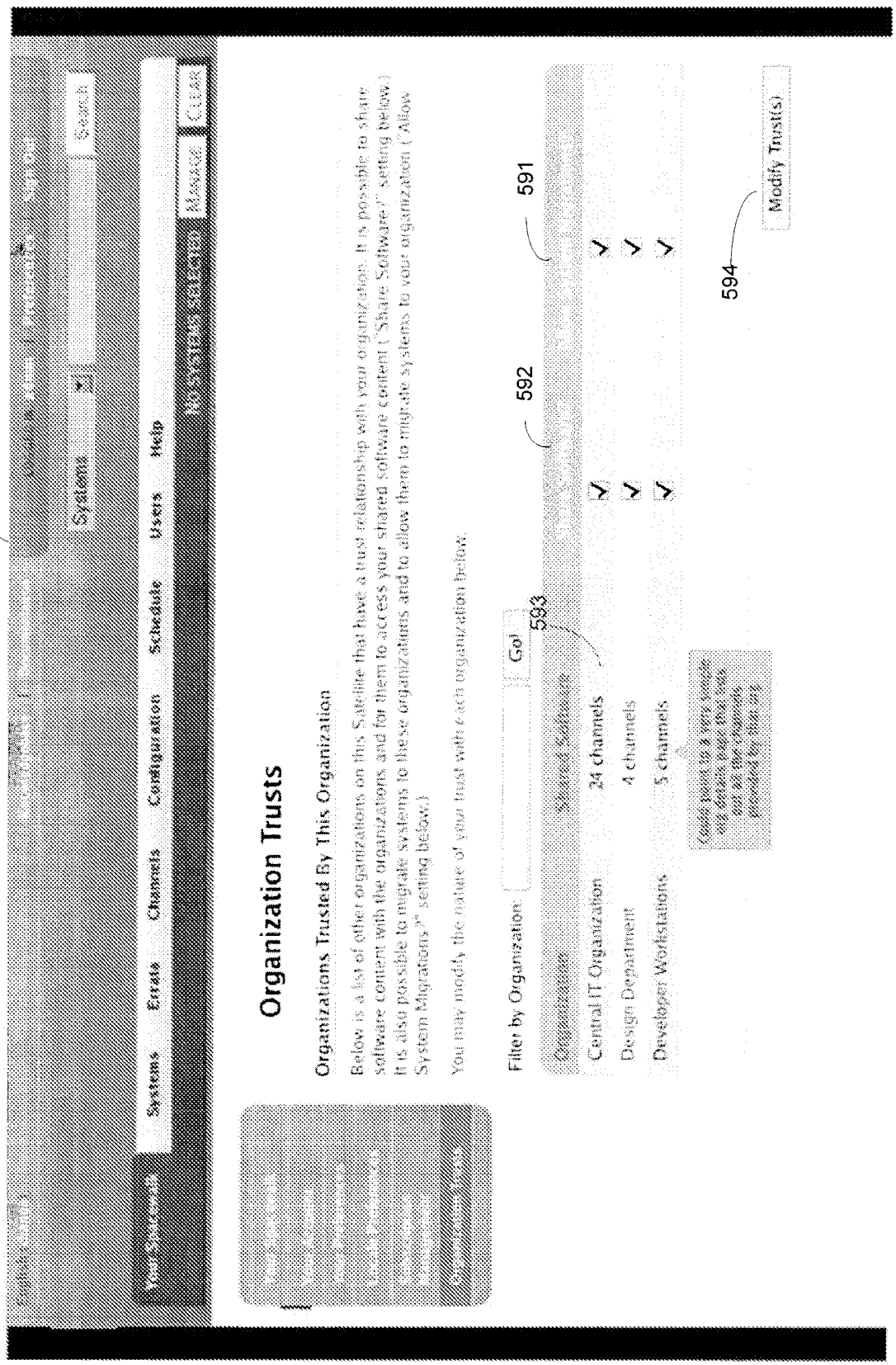

FIG. 5D illustrates one embodiment of a GUI 590 to display which organizations are trusted by a particular organization (which is Finance Department in the current example) and which organizations trust this particular organization. Via the GUI 590, an organization administrator of Finance Department can switch off system migration and/or channel sharing bits between channels of the organizations by checking off the corresponding boxes 591 and 592 and actuating the "Modify Trust(s)" button 594. The GUI 590 also displays the number of shared software channels 593 of each of the organizations. In some embodiments, the number of shared software channels of each organization may point or link to an organization details page that lists out all the channels provided by the corresponding organization.

Figure 6:
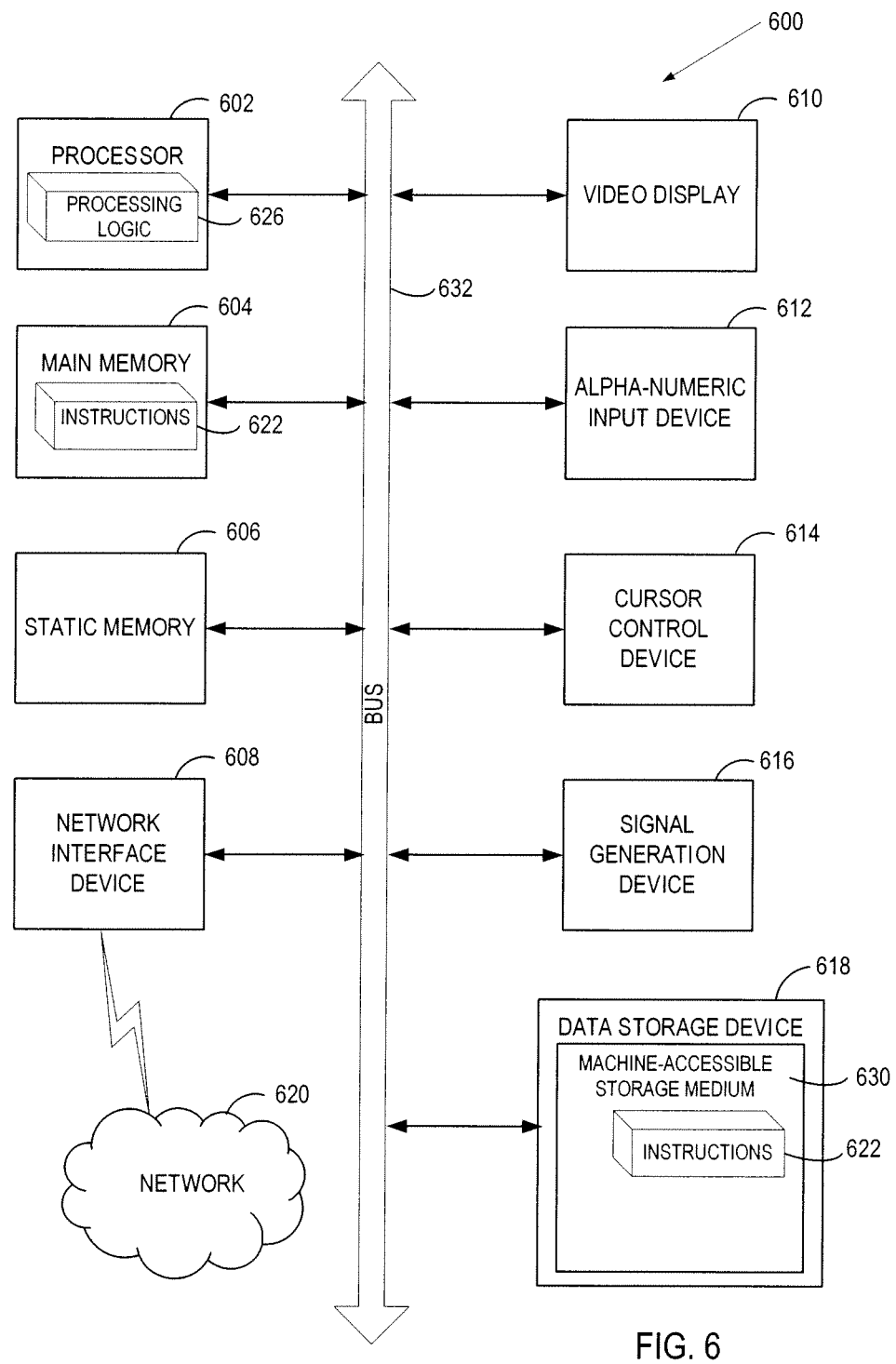
FIG. 6 illustrates a block diagram of an exemplary computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 632.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 630 (also known as a machine-readable storage medium or a computer-readable medium) on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media. The software 622 may further be transmitted or received over a network 620 via the network interface device 608.

While the machine-accessible storage medium 630 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of supporting trusted relationships between multiple organizations in a networked system have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    encapsulating, by a processing device, a plurality of computing machines within a networked system of a single entity into a plurality of organizations;
    establishing, by the processing device, a trusted relationship definition between a first organization and a second organization of the plurality of organizations of the single entity, wherein the trusted relationship definition enables sharing of a custom channel of a plurality of channels each comprising a collection of logically grouped software packages received from a different entity than the single entity and migrating of a system between the first organization and the second organization;
    receiving, by the processing device from the first organization of the single entity, an instruction identifying at least one of a selected custom channel created by the first organization, the selected custom channel comprising a first collection of logically grouped software packages selected by the first organization to share between the first organization and the second organization or a system to migrate between the first organization and the second organization; and
    applying, by the processing device, the trusted relationship definition to allow the first organization to perform at least one of sharing the selected custom channel comprising the first collection of logically grouped software packages with the second organization or migrating the system to the second organization.

2. The method of claim 1, further comprising:
    generating, by the processing device, a first graphical user interface (GUI) to allow a system administrator to create the plurality of organizations within the networked system and to define the trusted relationship definition.

3. The method of claim 1, further comprising:
    generating, by the processing device, a second GUI to allow the organization administrator of the first organization to identify at least one of the selected custom channel to share with the second organization or the system to migrate to the second organization.

4. The method of claim 3, further comprising:
    generating, by the processing device, a third GUI to allow a second organization administrator of the second organization to identify a channel to share with the first organization.

5. The method of claim 1, wherein the trusted relationship definition is applicable to content sharing between the first organization and the second organization to allow access to each other's one or more channels as defined in the trusted relationship definition.

6. The method of claim 1, wherein the user is a company and the plurality of organizations comprise a plurality of departments of the company.

7. The method of claim 1, further comprising:
    allowing the first organization to access a set of one or more public channels of the second organization; and
    allowing the first organization to access a set of one or more protected channels of the second organization in response to the second organization granting access to the first organization.

8. A system comprising:
    a memory to store a trusted relationship definition; and
    a processing device operatively coupled to the memory, the processing device to:
        encapsulate a plurality of computing machines within a networked system of a single entity into a plurality of organizations, establish the trusted relationship definition between a first organization and a second organization of the plurality of organizations of the single entity, wherein the trusted relationship definition enables sharing of a custom channel of a plurality of channels each comprising a collection of logically grouped software packages received from a different entity than the single entity and migrating of a system between the first organization and the second organization, receive an instruction from an organization administrator of the first organization of the single entity identifying at least one of a selected channel created by the first organization, the selected custom channel comprising a first collection of logically grouped software packages selected by the first organization to share between the first organization and the second organization or a system to migrate between the first organization and the second organization, and apply the trusted relationship definition to allow the first organization to perform at least one of sharing the selected custom channel comprising the first collection of logically grouped software packages with the second organization or migrating the system to the second organization.

9. The system of claim 8, further comprising:
a graphical user interface (GUI) module executable by the processing device to generate a first GUI to allow the system administrator to create the plurality of organizations within the networked system and to define the trusted relationship definition.

10. The system of claim 9, further comprising:
a graphical user interface (GUI) module executable by the processing device to generate a second GUI to allow the organization administrator of the first organization to identify at least one of the selected custom channel to share with the second organization or the system to migrate to the second organization.

11. The system of claim 10, further comprising:
a graphical user interface (GUI) module executable by the processing device to generate a third GUI to allow a second organization administrator of the second organization to identify a channel to share with the first organization.

12. The system of claim 8, wherein the trusted relationship definition is applicable to content sharing between the first organization and the second organization to allow access to each other's one or more channels as defined in the trusted relationship definition.

13. The system of claim 8, wherein the user is a company and the plurality of organizations comprise a plurality of departments of the company.

14. The system of claim 8, the processing device to allow the first organization to access a set of one or more public channels of the second organization, and allow the first organization to access a set of one or more protected channels of the second organization in response to the second organization granting access to the first organization.

15. A non-transitory computer-readable storage medium comprising instructions that, when executed by a processing device, cause the processing device to:

encapsulating, by the processing device, a plurality of computing machines within a networked system of a single entity into a plurality of organizations created by a user;

establishing, by the processing device, a trusted relationship definition between a first organization and a second organization of the plurality of organizations of the single entity, wherein the trusted relationship definition enables sharing of a custom channel of a plurality of channels each comprising a collection of logically grouped software packages received from a different entity than the single entity and migrating of a system between the first organization and the second organization;

receiving, by the processing device from the first organization of the single entity, an instruction identifying at least one of a selected custom channel created by the first organization, the selected custom channel comprising a first collection of logically grouped software packages selected by the first organization to share between the first organization and the second organization or a system to migrate between the first organization and the second organization; and apply, by the processing device, the trusted relationship definition to allow the first organization to perform at least one of sharing the selected custom channel comprising the first collection of logically grouped software packages with the second organization or migrating the system to the second organization.

16. The non-transitory computer-readable storage medium of claim 15, the processing device to:
generate-a first graphical user interface (GUI) to allow a system administrator to create the plurality of organizations within the networked system and to define the trusted relationship definition.

17. The non-transitory computer-readable storage medium of claim 16, the processing device to:
generate-a second GUI to allow the organization administrator of the first organization to identify the selected custom channel to share with the second organization.

18. The non-transitory computer-readable storage medium of claim 17, the processing device to:
generate a third GUI to allow a second organization administrator of the second organization to identify a channel to share with the first organization.

19. The non-transitory computer-readable storage medium of claim 15, wherein the trusted relationship definition is applicable to content sharing between the first organization and the second organization.

20. The non-transitory computer-readable storage medium of claim 15, wherein the user is a company and the plurality of organizations comprise a plurality of departments of the company.

21. The non-transitory computer-readable storage medium of claim 15, the processing device to:
allow-the first organization to access a set of one or more public channels of the second organization; and
allow-the first organization to access a set of one or more protected channels of the second organization in response to the second organization granting access to the first organization.

* * * * *